US009325670B2

(12) United States Patent
Wong et al.

(10) Patent No.: US 9,325,670 B2
(45) Date of Patent: Apr. 26, 2016

(54) COMMUNICATION INFORMATION TRANSMITTING PROCESS AND SYSTEM

(71) Applicants: Kwok fong Wong, Heshan (CN); Pui yi Ching, Heshan (CN)

(72) Inventors: Kwok fong Wong, Heshan (CN); Pui yi Ching, Heshan (CN)

(73) Assignee: WWTT Technology China, Heshan (CN)

( * ) Notice: Subject to any disclaimer, the term of this patent is extended or adjusted under 35 U.S.C. 154(b) by 0 days.

(21) Appl. No.: 14/000,209

(22) PCT Filed: Jan. 25, 2013

(86) PCT No.: PCT/CN2013/070995
§ 371 (c)(1),
(2) Date: Nov. 29, 2013

(87) PCT Pub. No.: WO2014/071703
PCT Pub. Date: May 15, 2014

(65) Prior Publication Data
US 2015/0237017 A1 Aug. 20, 2015

(30) Foreign Application Priority Data

Nov. 7, 2012 (CN) .......................... 2012 1 0437850

(51) Int. Cl.
*H04L 29/06* (2006.01)
(52) U.S. Cl.
CPC .......... *H04L 63/0428* (2013.01); *H04L 63/062* (2013.01)
(58) Field of Classification Search
CPC ........................ H04L 63/0428; H04L 63/062
See application file for complete search history.

(56) References Cited

U.S. PATENT DOCUMENTS

| 2002/0059144 | A1* | 5/2002 | Meffert | G06F 21/10 705/51 |
| 2003/0115142 | A1* | 6/2003 | Brickell | G06F 21/31 705/51 |
| 2003/0140235 | A1* | 7/2003 | Immega | G06F 21/32 713/186 |
| 2005/0102167 | A1* | 5/2005 | Kapoor | A61B 5/0006 705/3 |
| 2005/0228996 | A1* | 10/2005 | Mayer | H04L 12/58 713/170 |

(Continued)

*Primary Examiner* — Shawnchoy Rahman
(74) *Attorney, Agent, or Firm* — CBM Patent Consulting, LLC

(57) ABSTRACT

It discloses a type of communication information transmitting process and system, which belongs to the field of communication technology. The process comprises: acquire selected fingerprint information of communication information receiving terminal, makes use of the fingerprint information of communication information receiving terminal to conduct identity authentication. After identity authentication of communication information receiving terminal is successfully completed, acquire communication information input by the user; wherein, the communication information comprises E-mail or SMS; transmit the communication information to FingerQ Information Exchange Platform, which encrypts communication information, and transmit encrypted communication information to said communication information receiving terminal. The system comprises: communication information transmitting terminal and FingerQ Information Exchange Platform. This invention makes communication information not easily be acquired by a third party; moreover acquired communication information is encrypted with high degree of safety.

3 Claims, 5 Drawing Sheets

(56) References Cited

U.S. PATENT DOCUMENTS

| | | | |
|---|---|---|---|
| 2010/0174915 A1* | 7/2010 | Prokin | G06Q 40/02 713/189 |
| 2011/0119155 A1* | 5/2011 | Hammad et al. | 705/26.41 |
| 2013/0252585 A1* | 9/2013 | Moshir et al. | 455/411 |
| 2014/0025443 A1* | 1/2014 | Onischuk | G07C 13/00 705/12 |
| 2014/0365281 A1* | 12/2014 | Onischuk | G07C 13/00 705/12 |
| 2015/0012339 A1* | 1/2015 | Onischuk | G07C 13/00 705/12 |
| 2015/0134537 A1* | 5/2015 | Hammad | 705/67 |

* cited by examiner

COMMUNICATION INFORMATION TRANSMITTING PROCESS AND SYSTEM

TECHNICAL FIELD

The invention relates to the filed of communication technology, particularly to a type of communication information transmitting process and system.

BACKGROUND ART

With the development of communication technology, it becomes more and more convenient to transmit and receive E-mail, SMS, etc., which is important means for people to exchange information. Currently, the process for transmitting E-mail and SMS is as follows: the user inputs E-mail at transmitting terminal of E-mail or input short message at transmitting terminal of short message, transmitting terminal of E-mail acquires the user's transmitting instructions and directly transmits the E-mail to corresponding receiving terminal of E-mail or transmitting terminal of short message acquires the user's transmitting instructions and directly transmits the short message to corresponding receiving terminal of short message.

However, in the realization of invention, the inventor finds that current technology has at least the following problem:

In current technology, transmitting terminal of E-mail directly transmits the E-mail to corresponding receiving terminal of E-mail or transmitting terminal of short message directly transmits the short message to corresponding receiving terminal of short message, the content of E-mail or short message will be easily acquired by a third party; the privacy of E-mail or short message cannot be protected and the technology for transmission has very low degree of safety.

SUMMARY OF THE INVENTION

To solve the problem in current technology, the embodiments of this invention provide a type of communication information transmitting process and system. Below is the said technical proposal:

In one aspect, a type of communication information transmitting process is provided, comprising:

Communication information transmitting terminal acquires selected fingerprint information of communication information receiving terminal, makes use of said fingerprint information to conduct identity authentication of said communication information receiving terminal;

After identity authentication of communication information receiving terminal is successfully completed, said communication information transmitting terminal acquires communication information input by the user; wherein, said communication information comprises E-mail or SMS;

Said communication information transmitting terminal transmits said communication information to FingerQ Information Exchange Platform, which encrypts said communication information, and transmits encrypted communication information to said communication information receiving terminal.

In a further aspect, a type of communication information transmitting system is provided, comprising: communication information transmitting terminal and FingerQ Information Exchange Platform, connection between said communication information transmitting terminal and said FingerQ Information Exchange Platform;

Wherein, said communication information transmitting terminal comprises:

Transmitting terminal fingerprint sensor is used to acquire selected fingerprint information of communication information receiving terminal, make use of said fingerprint information to conduct identity authentication of said communication information receiving terminal;

Communication information acquirer, connecting to said transmitting terminal fingerprint sensor, is used to acquire communication information input by the user after identity authentication of said communication information receiving terminal is successfully completed by said transmitting terminal fingerprint sensor; wherein, said communication information comprises E-mail or SMS;

Communication information transmitter, connecting to said communication information acquirer, is used to transmit communication information acquired by said communication information acquirer to said FingerQ Information Exchange Platform;

Accordingly, Wherein, said FingerQ Information Exchange Platform includes:

Communication information receiver, connecting to said communication information transmitter, is used to receive communication information transmitted by said communication information transmitter;

Communication information processor, connecting to said communication information receiver, is used to encrypt communication information received by communication information receiver, transmit encrypted communication information to said communication information receiving terminal.

The beneficial effects brought by technical proposal of this invention's embodiments comprise:

The process to acquire and make use of fingerprint information of communication information receiving terminal to conduct identity authentication of communication information receiving terminal, encrypt communication information and transmit encrypted information to communication information receiving terminal makes sure that only communication information receiving terminal with identity authentication can acquire communication information, so that communication information will not easily be acquired by a third party; moreover acquired communication information is encrypted that privacy of communication information can be well protected with high degree of safety.

DESCRIPTION OF THE DRAWINGS

In order to illustrate more clearly technical proposal of this invention's embodiments, below is a simple description of the drawings to be used in the embodiments. Obviously, the drawings in the description below are only some embodiments of this invention, for ordinary technicians in this field, without contributing creative labour, they are able to acquire other drawings on the basis of these drawings.

DETAILED DESCRIPTION OF THE PREFERRED EMBODIMENTS

To make clearer the purpose, technical proposal and advantages of the invention, below is a more detailed description of this invention in combination with the accompanying figures and embodiments.

Embodiment 1

Figure 1:
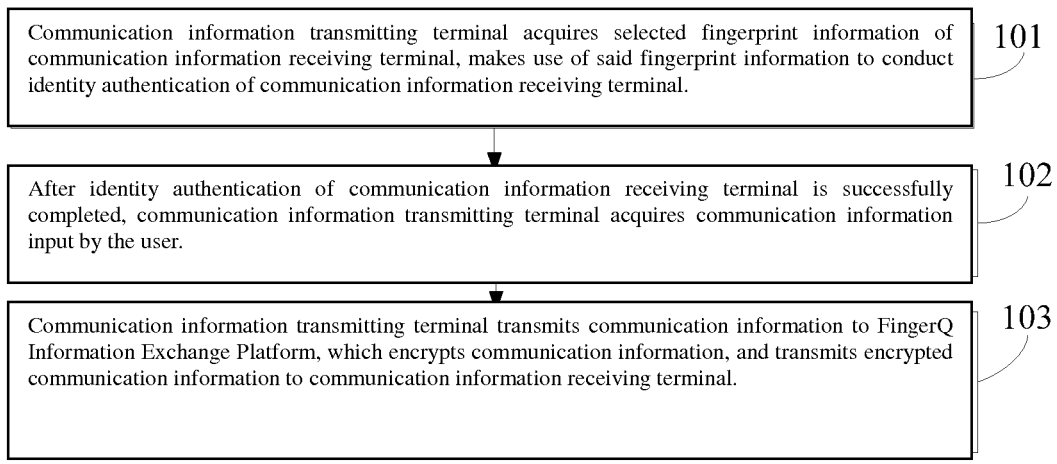
FIG. 1 is a flowchart of communication information transmitting process provided by Embodiment 1 of this invention.

As shown in FIG. 1, Embodiment 1 of this invention provides a type of communication information transmitting process, comprising:

101: Communication information transmitting terminal acquires selected fingerprint information of communication information receiving terminal, makes use of said fingerprint information to conduct identity authentication of communication information receiving terminal.

102: After identity authentication of communication information receiving terminal is successfully completed, communication information transmitting terminal acquires communication information input by the user; wherein, said communication information comprises E-mail or SMS.

103: Communication information transmitting terminal transmits communication information to FingerQ Information Exchange Platform, which encrypts communication information, and transmits encrypted communication information to communication information receiving terminal.

Preferably, communication information transmitting terminal acquires selected fingerprint information of communication information receiving terminal, comprising:

Communication information transmitting terminal selects corresponding communication information receiving terminal, and communication information transmitting terminal is registered on FingerQ Information Exchange Platform, notifies communication information receiving terminal to be registered on said FingerQ Information Exchange Platform;

Communication information transmitting terminal acquires registration information of communication information receiving terminal, which comprises fingerprint information of communication information receiving terminal.

Preferably, after identity authentication of communication information receiving terminal is successfully completed and before communication information transmitting terminal acquires communication information input by the user, the process also comprises:

Through FingerQ Information Exchange Platform, communication information transmitting terminal transmits secret key exchange request and secret key of communication information transmitting terminal to communication information receiving terminal;

Communication information transmitting terminal receives confirmation message of secret key exchange transmitted by communication information receiving terminal through FingerQ Information Exchange Platform and secret key of communication information receiving terminal;

Accordingly, communication information transmitting terminal transmits communication information to FingerQ Information Exchange Platform, which encrypts communication information, transmits encrypted communication information to communication information receiving terminal, i.e.:

Communication information transmitting terminal transmits communication information to FingerQ Information Exchange Platform, which makes use of secret key of communication information transmitting terminal to encrypt communication information, then transmits encrypted communication information to communication information receiving terminal.

Preferably, after FingerQ Information Exchange Platform encrypts communication information and transmits encrypted communication information to communication information receiving terminal, the process also comprises:

Communication information receiving terminal receives and decrypts the encrypted communication information, so as to acquire and display decrypted communication information.

Preferably, before communication information receiving terminal receives and decrypts the encrypted communication information, the process also comprises:

Communication information receiving terminal acquires fingerprint information of communication information transmitting terminal, makes use of said fingerprint information to conduct identity authentication of communication information transmitting terminal;

After identity authentication of communication information transmitting terminal is successfully completed, communication information receiving terminal executes the step of receiving and decrypting encrypted communication information.

For the said communication information transmitting process in the embodiment of this invention, the process to acquire and make use of fingerprint information of communication information receiving terminal to conduct identity authentication of communication information receiving terminal, encrypt communication information and transmit encrypted information to communication information receiving terminal makes sure that only communication information receiving terminal with identity authentication can acquire communication information, so that communication information will not easily be acquired by a third party; moreover acquired communication information is encrypted that privacy of communication information can be well protected with high degree of safety.

It needs to be noted that, the said communication information transmitting process in the embodiment of this invention can be applied in terminals such as computer, and also in mobile terminals such as mobile phone, which prescribes no limit to this.

Embodiment 2

Figure 2:
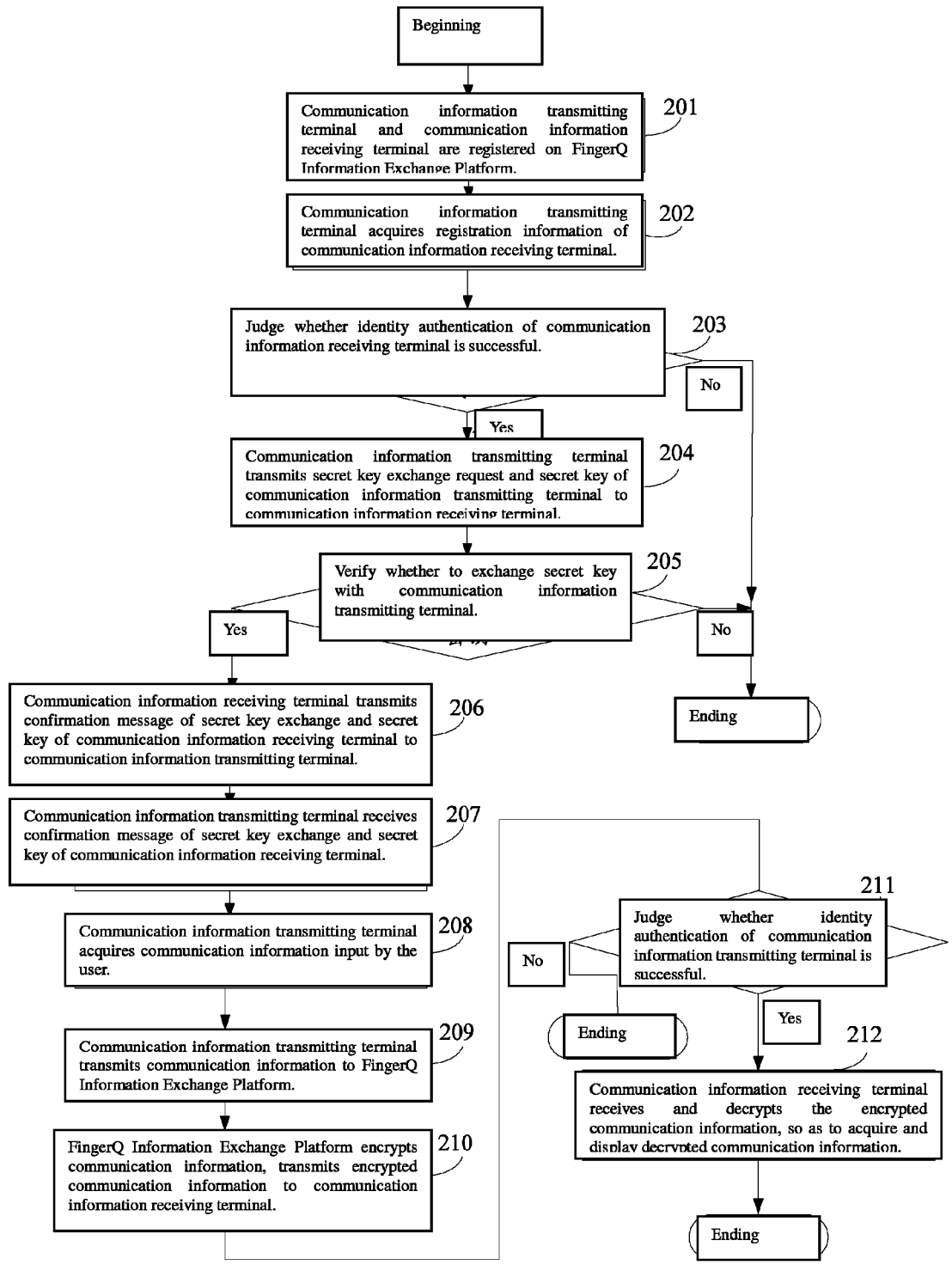
FIG. 2 is a flowchart of communication information transmitting process provided by Embodiment 2 of this invention.

As shown in FIG. 2, Embodiment 2 of this invention provides a type of communication information transmitting process, comprising:

201: Communication information transmitting terminal selects corresponding communication information receiving terminal, and communication information transmitting terminal is registered on FingerQ Information Exchange Platform, and notifies communication information receiving terminal to be registered on FingerQ Information Exchange Platform.

Specifically, communication information transmitting terminal is registered on FingerQ Information Exchange Platform, so as to form registration information of communication information transmitting terminal, which comprises fingerprint information of communication information transmitting terminal, registered name of communication information transmitting terminal, account number of communication information transmitting terminal, etc.

Specifically, it is possible to install transmitting terminal fingerprint sensor at communication information transmitting terminal, which extracts fingerprint information of the user corresponding to communication information transmitting terminal so as to acquire fingerprint information of communication information transmitting terminal. In addition, it is possible to install a storer at communication information transmitting terminal, which stores fingerprint information of the user corresponding to communication information transmitting terminal.

Specifically, communication information receiving terminal is registered on FingerQ Information Exchange Platform, so as to form registration information of communication information receiving terminal, which comprises fingerprint information of communication information receiving terminal, registered name of communication information receiving terminal, account number of communication information receiving terminal, etc.

Specifically, it is possible to install receiving terminal fingerprint sensor at communication information receiving terminal, which extracts fingerprint information of the user corresponding to communication information receiving terminal so as to acquire fingerprint information of communication information receiving terminal. In addition, it is possible to install a storer at communication information receiving terminal, which stores fingerprint information of the user corresponding to communication information receiving terminal.

202: Communication information transmitting terminal acquires registration information of communication information receiving terminal, which comprises fingerprint information of communication information receiving terminal.

Specifically, communication information transmitting terminal visits FingerQ Information Exchange Platform, from which it acquires registration information of communication information receiving terminal.

In addition, it is possible to install a storer at communication information transmitting terminal, which stores registration information of communication information receiving terminal.

203: Communication information transmitting terminal makes use of fingerprint information of communication information receiving terminal to conduct identity authentication of communication information receiving terminal; judge whether identity authentication of communication information receiving terminal is successfully completed, if it is successful, execute 204; otherwise, terminate the process.

204: Through FingerQ Information Exchange Platform, communication information transmitting terminal transmits secret key exchange request and secret key of communication information transmitting terminal to communication information receiving terminal;

Specifically, communication information transmitting terminal transmits secret key exchange request and secret key of communication information transmitting terminal to FingerQ Information Exchange Platform, which transmits said information to communication information receiving terminal.

205: Communication information receiving terminal receives secret key exchange request and secret key of communication information transmitting terminal, verifies whether to execute secret key exchange with communication information transmitting terminal; if exchange is confirmed, execute 206; otherwise, terminate the process.

Specifically, communication information receiving terminal can store secret key of communication information transmitting terminal into the storer of communication information receiving terminal.

206: Through FingerQ Information Exchange Platform, communication information receiving terminal transmits to communication information transmitting terminal confirmation message of secret key exchange and secret key of communication information receiving terminal.

Specifically, communication information receiving terminal transmits confirmation message of secret key exchange and secret key of communication information receiving terminal to FingerQ Information Exchange Platform, which transmits confirmation message of secret key exchange and secret key of communication information receiving terminal transmitted by communication information receiving terminal to communication information transmitting terminal.

207: Communication information transmitting terminal receives confirmation message of secret key exchange and secret key of communication information receiving terminal transmitted by communication information receiving terminal through FingerQ Information Exchange Platform.

208: Communication information transmitting terminal acquires communication information input by the user; wherein, communication information comprises E-mail or SMS.

Specifically, after communication information transmitting terminal receives confirmation message of secret key exchange and secret key of communication information receiving terminal transmitted by communication information receiving terminal through FingerQ Information Exchange Platform, it can notify the user to input communication information.

209: Communication information transmitting terminal transmits communication information to FingerQ Information Exchange Platform.

210: FingerQ Information Exchange Platform makes use of secret key of communication information transmitting terminal to encrypt communication information and transmits encrypted communication information to communication information receiving terminal.

211: Communication information receiving terminal acquires fingerprint information of communication information transmitting terminal, makes use of said fingerprint information to conduct identity authentication of communication information transmitting terminal; judge whether identity authentication of communication information transmitting terminal is successfully completed, if it is successful, execute 212; otherwise, terminate the process.

Specifically, communication information receiving terminal visits FingerQ Information Exchange Platform, from which it acquires registration information of communication information transmitting terminal, then acquires fingerprint information of communication information transmitting terminal from the registration information.

212: Communication information receiving terminal receives and decrypts the encrypted communication information, so as to acquire and display decrypted communication information, then the process ends.

For the said communication information transmitting process in the embodiment of this invention, the process to acquire and make use of fingerprint information of communication information receiving terminal to conduct identity authentication of communication information receiving terminal, encrypt communication information and transmit encrypted information to communication information receiving terminal makes sure that only communication information receiving terminal with identity authentication can acquire communication information, so that communication information will not easily be acquired by a third party; moreover acquired communication information is encrypted that privacy of communication information can be well protected with high degree of safety.

Embodiment 3

Figure 3:
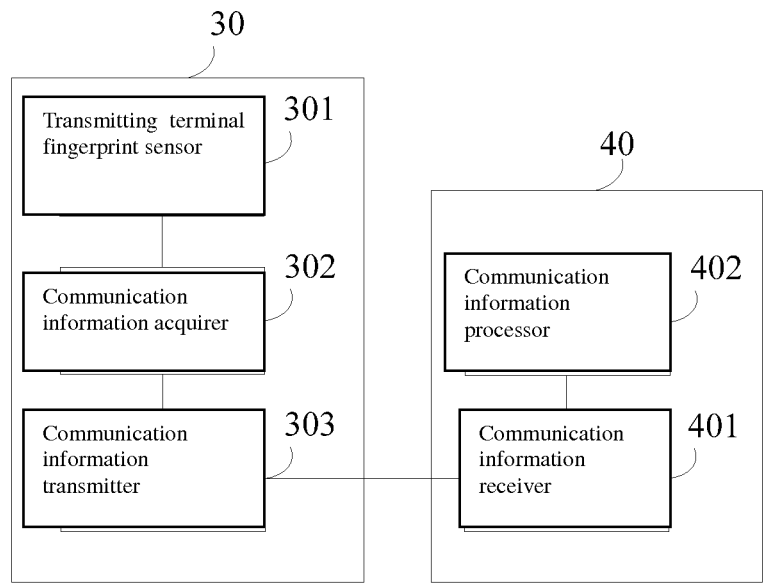
FIG. 3 is a schematic view of the first type of communication information transmitting system provided by Embodiment 3 of this invention.

As shown in FIG. 3, Embodiment 3 of this invention provides a type of communication information transmitting system, comprising: communication information transmitting terminal 30 and FingerQ Information Exchange Platform 40, connection between communication information transmitting terminal 30 and FingerQ Information Exchange Platform 40;

Wherein, communication information transmitting terminal 30 comprises:

Transmitting terminal fingerprint sensor 301, is used to acquire selected fingerprint information of communication information receiving terminal 50, make use of said fingerprint information to conduct identity authentication of communication information receiving terminal 50;

Communication information acquirer 302, connecting to transmitting terminal fingerprint sensor 301, is used to acquire communication information input by the user after identity authentication of communication information receiving terminal 50 is successfully completed by transmitting terminal fingerprint sensor 301; wherein, communication information comprises E-mail or SMS;

Communication information transmitter 303, connecting to communication information acquirer 302, is used to transmit communication information acquired by communication information acquirer 302 to FingerQ Information Exchange Platform 40;

Accordingly, wherein, FingerQ Information Exchange Platform 40 comprises:

Communication information receiver 401, connecting to communication information transmitter 303, is used to receive communication information transmitted by communication information transmitter 303;

Communication information processor 402, connecting to communication information receiver 401, is used to encrypt communication information received by communication information receiver 401, transmit encrypted communication information to communication information receiving terminal 50.

Figure 4:
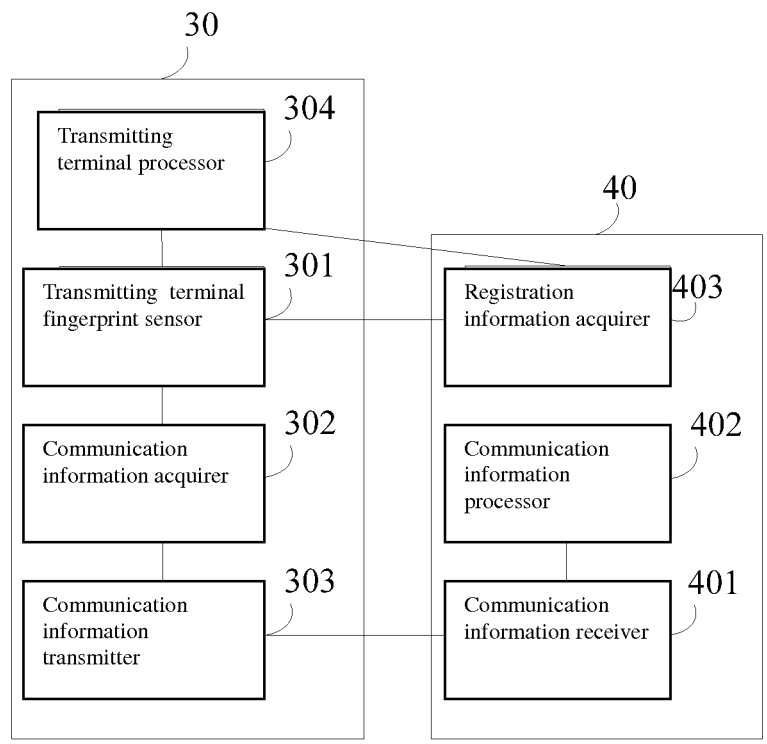
FIG. 4 is a schematic view of the second type of communication information transmitting system provided by Embodiment 3 of this invention.

Preferably, as shown in FIG. 4, communication information transmitting terminal 30 also comprises:

Transmitting terminal processor 304, connecting to transmitting terminal fingerprint sensor 301, is used to select corresponding communication information receiving terminal, make communication information transmitting terminal 30 registered on FingerQ Information Exchange Platform 40, and notify communication information receiving terminal 50 to be registered on FingerQ Information Exchange Platform 40;

Accordingly, FingerQ Information Exchange Platform 40 also comprises:

Registration information acquirer 403, connecting to transmitting terminal processor 304, is used to acquire registration information of communication information transmitting terminal 30 on FingerQ Information Exchange Platform 40 and registration information of communication information receiving terminal 50 on FingerQ Information Exchange Platform 40;

Accordingly, transmitting terminal fingerprint sensor 301, connecting to registration information acquirer 403, is used to acquire registration information of communication information receiving terminal 50 through registration information acquirer 403, wherein, registration information of communication information receiving terminal 50 comprises fingerprint information of communication information receiving terminal 50.

Figure 5:
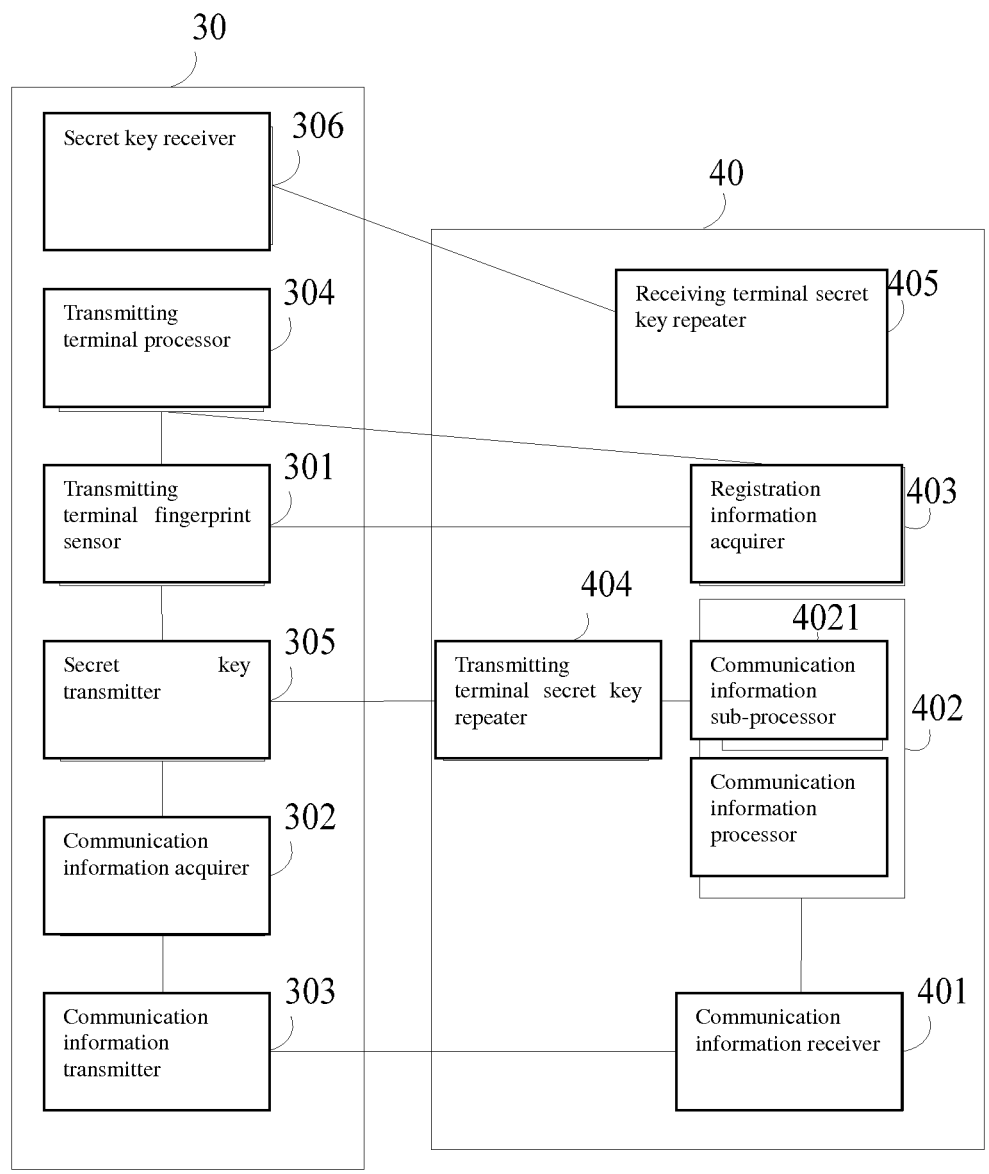
FIG. 5 is a schematic view of the third type of communication information transmitting system provided by Embodiment 3 of this invention.

Preferably, as shown in FIG. 5, communication information transmitting terminal 30 also comprises:

Secret key transmitter 305, respectively connecting to transmitting terminal fingerprint sensor 301 and communication information acquirer 302, is used to transmit secret key exchange request and secret key of communication information transmitting terminal 30 to FingerQ Information Exchange Platform 40 after identity authentication of communication information receiving terminal 50 is successfully completed by transmitting terminal fingerprint sensor 301 and before communication information acquirer 302 acquires communication information input by the user;

Accordingly, FingerQ Information Exchange Platform 40 also comprises:

Transmitting terminal secret key repeater 404, connecting to secret key transmitter 305, is used to receive secret key exchange request transmitted by secret key transmitter 305 and secret key of communication information transmitting terminal 30, transmit said information to communication information receiving terminal 50;

Receiving terminal secret key repeater 405, connecting to communication information transmitter 30, is used to receive confirmation message of secret key exchange transmitted by communication information receiving terminal 50 and secret key of communication information receiving terminal 50, transmit said information to communication information transmitting terminal 30;

Accordingly, communication information transmitting terminal 30 also comprises:

Secret key receiver 306, connecting to receiving terminal secret key repeater 405, is used to receive confirmation message of secret key exchange transmitted by receiving terminal secret key repeater 405 and secret key of communication information receiving terminal 50;

Accordingly, communication information processor 402 comprises:

Communication information sub-processor 4021, respectively connecting to transmitting terminal secret key repeater 404 and communication information receiver 401, makes use of secret key of communication information transmitting terminal 30 acquired by transmitting terminal secret key repeater 404 to encrypt communication information received by communication information receiver 401, transmits encrypted communication information to communication information receiving terminal 50.

Figure 6:
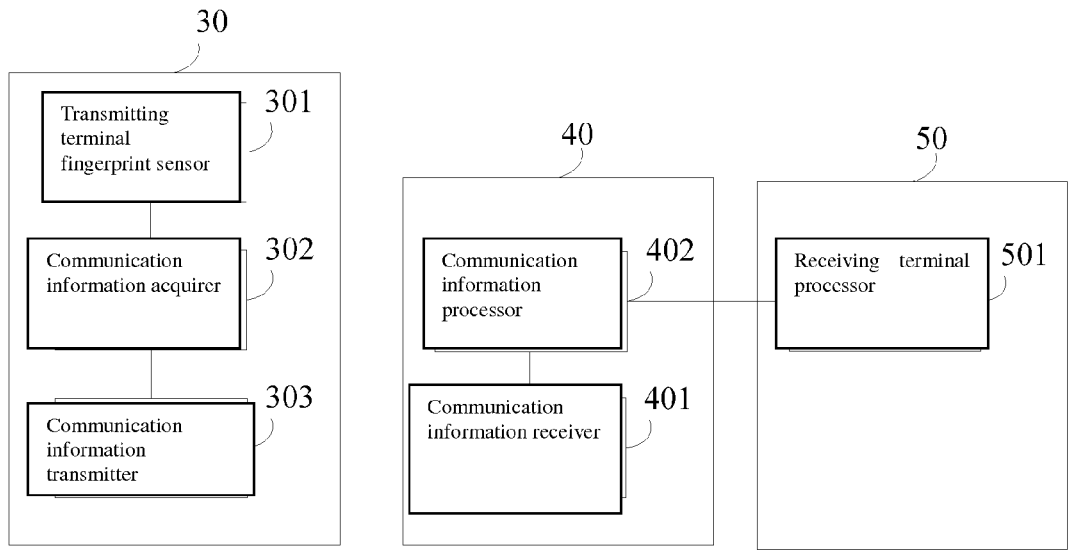
FIG. 6 is a schematic view of the fourth type of communication information transmitting system provided by Embodiment 3 of this invention.

Preferably, as shown in FIG. 6, the system also comprises: communication information receiving 50, connection between communication information receiving 50 and FingerQ Information Exchange Platform 40;

Wherein, communication information receiving 50 comprises:

Receiving terminal processor 501, connecting to communication information processor 402, is used to receive encrypted communication information transmitted by communication information processor 402, decrypt the encrypted communication information, acquire and display decrypted communication information.

Figure 7:
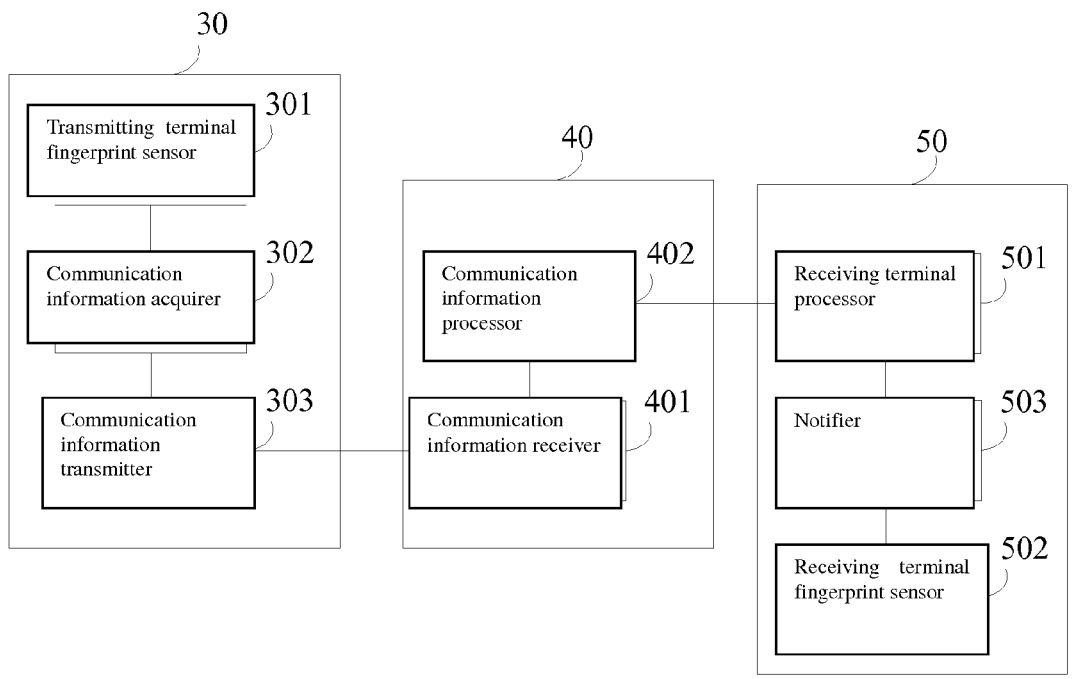
FIG. 7 is a schematic view of the fifth type of communication information transmitting system provided by Embodiment 3 of this invention.

Preferably, as shown in FIG. 7, communication information receiving 50 also comprises:

Receiving terminal fingerprint sensor 502, is used to acquire fingerprint information of communication information transmitting terminal 30, make use of said fingerprint information to conduct identity authentication of communication information transmitting terminal 30;

Notifier 503, respectively connecting to receiving terminal fingerprint sensor 502 and receiving terminal processor 501, is used to notify receiving terminal processor 501 to execute the step of receiving encrypted communication information transmitted by communication information processor 402 after identity authentication of communication information transmitting terminal 30 is successfully completed by receiving terminal fingerprint sensor 502.

It needs to be noted that, a storer can be installed in both communication information transmitting terminal 30 and communication information receiving terminal 50 to store respective fingerprint information and secret key, or mutual fingerprint information and secret key.

It needs to be noted that, various types of equipment in the embodiments of this invention are connected in wired mode, wireless mode or other ways, which can be set according to actual conditions of application and should prescribe no limit to this.

For the said communication information transmitting system in the embodiment of this invention, the process to acquire and make use of fingerprint information of communication information receiving terminal to conduct identity authentication of communication information receiving terminal, encrypt communication information and transmit encrypted information to communication information receiving terminal makes sure that only communication information receiving terminal with identity authentication can acquire communication information, so that communication information will not easily be acquired by a third party; moreover acquired communication information is encrypted that privacy of communication information can be well protected with high degree of safety.

The serial number of above embodiments of this invention is only for description, not representing merit ranking of the embodiments.

Ordinary technicians in this field can comprehend that all or parts of the steps to realize above embodiments can be achieved through hardware, or be achieved in the way that relevant process instructs relevant hardware, said process can be stored in a type of readable storage medium of computer, which comprises read-only memory, magnetic disk or optical disk, etc.

Described above solely for the purpose of the present invention are preferred embodiments only, not intended to limit the present invention, where any modifications made within the spirit and principle of the present invention, equivalent substitutions, and improvements, etc., should be included in the protection of the invention range.

What is claimed is:

1. A system for transmitting communication information comprises: a receiving computer, a sending computer, and a finger information exchange device;

wherein, the sending computer comprising:

a transmitting terminal fingerprint sensor that acquires a fingerprint information of receiver, and issues an authentication for the receiving computer;

a communication information acquirer, connected to said transmitting terminal fingerprint sensor, acquires a communication information input by a sender after the authentication is issued; wherein, said communication information is E-mail or SMS;

a communication information transmitter, connected to said communication information acquirer, transmits communication information acquired by said communication information acquirer to the finger information exchange device;

wherein, the finger information exchange device comprising:

a communication information receiver, connected to said communication information transmitter, receives the communication information;

a communication information processor, connected to said communication information receiver, encrypts the communication information, and transmits the encrypted communication information to the receiving computer;

a transmitting terminal processor, connected to said transmitting terminal fingerprint sensor, selects the receiving computer, and registers the sending computer in the finger information exchange device, and to the receiving computer;

the finger information exchange device further comprising:

a registration information acquirer, connected to said transmitting terminal processor, acquires the registration information of the sending computer in the finger information exchange device and the registration information of the receiving computer in the finger information exchange device;

the transmitting terminal fingerprint sensor, connected to said registration information acquirer, acquires the registration information of the receiving computer through the registration information acquirer, wherein the registration information of the receiving computer comprises the fingerprint;

the system further comprising:

a secret key transmitter, connected to the transmitting terminal fingerprint sensor and said communication information acquirer, requests a secret key of the sending computer to finger information exchange device after the authentication for the sending computer is issued;

the finger information exchange device further comprising:

a transmitting terminal secret key repeater, connected to said secret key transmitter, receives the request for the secret key and the secret key of the sending computer, and transmits the communication information to the receiving computer;

a receiving terminal secret key repeater, connected to said communication information transmitter, receives a confirmation message of the request for the secret key by the receiving computer, transmits the communication information to the sending computer;

the sending computer further comprising:

a secret key receiver, connected to said receiving terminal secret key repeater, receives the confirmation message transmitted by said receiving terminal secret key repeater and the secret key of the receiving computer;

the communication information processor comprising:

a communication information sub-processor, connected to said transmitting terminal secret key repeater and said communication information receiver, respectively, utilizes the secret key of the sending computer acquired by said transmitting terminal secret key repeater to encrypt the communication information received by the receiver, transmits the encrypted communication information to the receiving computer.

2. The system according to claim 1, the receiving computer comprising:
- a receiving terminal processor, connected to communication information processor, used to receives the encrypted communication information transmitted by said communication information processor, to decrypt the encrypted communication information, acquires and displays the decrypted communication information.

3. The system according to claim 2, characterized in that the receiving computer further comprises:
- a receiving terminal fingerprint sensor, acquires the fingerprint information of the sender, utilizes the fingerprint information for issuing an authentication of the sending computer;
- a notifier, connected to said receiving terminal fingerprint sensor and said receiving terminal processor, respectively, notifies said receiving terminal processor to execute the step of receiving encrypted communication information transmitted by said communication information processor after the authentication for the sending computer.

* * * * *